UNITED STATES PATENT OFFICE 2,381,180

STABILIZED CYCLIZED RUBBER

Harold J. Osterhof, Cuyahoga Falls, Ohio, assignor to Wingfoot Corporation, Akron, Ohio, a corporation of Delaware No Drawing. Application March 12, 1942,
Serial No. 434,363

3 Claims. (Cl. 260—734)

This invention relates to the stabilization of cyclized rubbers and more particularly to the use of aldehyde condensation products of polyalkylene polyamines to inhibit the photochemical deterioration thereof.

There are various types of cyclized rubbers which have been used commercially, and other types have been described in the literature. This invention relates particularly to the stabilization of those cyclized rubber derivatives produced by the treatment of rubber with the halide of an amphoteric metal, or a compound such as chlorostannic acid, which are of the type known to the trade as Pliolite and produced by The Goodyear Tire & Rubber Company. The invention, however, is applicable to the other types such as the products produced by phenol sulfonic acid or by sulfonic acid or by hydrogen fluoride, etc.

The inhibitors useful in the invention are prepared by reacting an aldehyde with a polyalkylene polyamine with attendant elimination of water to produce a condensation product.

Reactions between aldehydes and polyalkylene polyamines are very complex as demonstrated by the following equations and formulas in which acetaldehyde and diethylene triamine are used for illustrative purposes. For example, if the terminal groups of the amine are primary amino, one or both of them may react to form an alkylidene type compound as represented by the following equation:

(1) $CH_3CHO + NH_2-C_2H_4-NH-C_2H_4-NH_2 \longrightarrow$
$CH_3CH=N-C_2H_4-NH-C_2H_4-NH_2 + H_2O$ If the terminal groups are either primary or secondary amino, two molecules of the amine may be linked through the residue of the carbonyl compound, as shown in Equation 2:

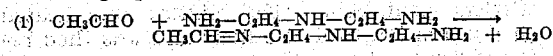

In addition, when the intermediate amino groups contain reactive hydrogen, i. e., are secondary amino, it is possible to have cross-linkages between several molecules of amine through the residue of the carbonyl compound as illustrated by the following structural formula:

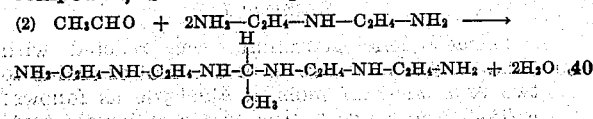

Also, it is conceivable that other types of reaction may occur. Especially in view of the fact that various combinations and continuations of the foregoing type reactions may take place, it is obvious that the reaction products may contain a large number of individual compounds.

The preparation of the photochemical inhibitors of the invention is illustrated by the following examples.

Example 1

The maximum amount of aldehyde which theoretically can be reacted with diethylene triamine is 2½ mols of the aldehyde to each mol of the amine. This example represents reaction of diethylene triamine with formaldehyde in this proportion. To 38 grams of diethylene triamine, 78 grams (4% excess) of 37% formaldehyde were added slowly with stirring, the mixture becoming quite viscous toward the end of the addition. One hundred c. c. of benzene were then added and the mixture was refluxed, water being removed by means of a trap in the reflux line. When the evolution of water ceased and all of the water had been trapped out, the benzene was distilled off at reduced pressure. The product was a viscous, orange liquid and was obtained in theoretical yield.

Example 2

Triethylene tetramine was reacted with formaldehyde in equimolecular proportions as follows: Thirty-two and two-tenths grams of 37% formaldehyde were added slowly with stirring to 58.2 grams of triethylene tetramine, keeping the temperature at 50–60° C. After all the aldehyde had been added, the temperature was raised to 110–120° C. and the water was distilled out under reduced pressure. The product was an amber liquid and was obtained in theoretical yield.

Example 3

Triethylene tetramine was reacted with formaldehyde in the proportion of one mol of amine to two mols of aldehyde as follows: To a solution of 27.5 grams of triethylene tetramine in 110 c. c. of benzene, 31 grams of 37% formaldehyde were added slowly with stirring. The mixture was refluxed for six hours, the water formed being trapped out. Benzene was thereafter removed by distillation at reduced pressure leaving a gel residue, which upon heating to 200° C. became a liquid and remained as such after cooling. The yield was quantitative.

Example 4

Triethylene tetramine can theoretically be reacted with an aldehyde in the proportion of one mol of the amine to a maximum of three mols of the aldehyde. In this example, an excess of formaldehyde over this proportion was used but the weight of product obtained indicated that only three molecules of the aldehyde reacted per mol of amine. To 52 grams of triethylene tetramine were added 116.4 grams (30 gram excess) of 37% formaldehyde and the mixture was refluxed for one hour, distilling off the water. At first a gel formed but this gradually disappeared as the water was removed. After drying, the product was a viscous, dark-red semi-solid. The yield was quantitative for the reaction product of one mol of triethylene tetramine and three mols of formaldehyde.

*Example 5*

Tetraethylene pentamine was reacted with formaldehyde in equimolecular proportions as follows: Thirty-two and two-tenths grams of 37% formaldehyde were added slowly to 75.2 grams of tetraethylene pentamine, maintaining the temperature at 60–70° C. The temperature was then raised to 110–115° C. and maintained for one hour. The mixture was then heated first to 250° C. and then to 200° C. at 30–40 mm. pressure until all of the water present was removed. The product was a dark-orange, viscous liquid and was obtained in 95% yield.

*Example 6*

Tetraethylene pentamine was reacted with formaldehyde in the ratio of one mol of amine to two mols of aldehyde as follows: Sixty-one grams of 37% formaldehyde were added to 71 grams of tetraethylene pentamine, keeping the temperature at 60–70° C. The temperature was raised to 105–110° C. for 1¼ hours, and the mixture was then heated to 270° C. at atmospheric pressure followed by heating at the same temperature at a slightly reduced pressure until no more water distilled off. The product was a dark-red, slightly fluorescent liquid and was obtained in 91% yield.

*Example 7*

Tetraethylene pentamine was reacted with formaldehyde in the ratio of two mols of amine to five mols of aldehyde as follows: Seventy-four grams of 37% formaldehyde were added slowly to sixty-nine grams of tetraethylene pentamine, keeping the temperature at 60–70° C. The mixture became somewhat gelatinous toward the end of the addition of the aldehyde. The reaction mixture was then heated at 105–110° C. for 2½ hours and was dried by heating to 230° C. at 40–60 mm. pressure. The product was a dark-red, slightly fluorescent, very viscous liquid and was obtained in almost theoretical yield.

*Example 8*

Tetraethylene pentamine was reacted with formaldehyde in the ratio of one mol of amine to three mols of aldehyde as follows: Eighty-six and four-tenths grams of 37% formaldehyde were added in small portions to 67.1 grams of tetraethylene pentamine and the mixture was then heated at 105–110° C. for two hours. The water present was then removed by heating to 200° C. at 60–80 mm. pressure. The product was a dark-red, slightly fluorescent, viscous liquid and was obtained in practically quantitative yield.

*Example 9*

Tetraethylene pentamine theoretically can be completely reacted with an aldehyde in the proportion of one mol of amine to three and one-half mols of aldehyde. This example demonstrates the reaction of tetraethylene pentamine with formaldehyde in this ratio. Ninety-eight and two-tenths grams of 37% formaldehyde were added slowly to 65.5 grams of tetraethylene pentamine. The reaction mixture was then heated at 105–110° C. for three hours and was dried by heating to 200° C. at 50–70 mm. pressure. The product was a dark-red, very viscous liquid and was obtained in 92% yield.

*Example 10*

Ammonia, tetraethylene pentamine and formaldehyde were reacted in the proportion of one mol of ammonia to one mol of the amine and two mols of the aldehyde as follows: Seventy grams of tertaethylene pentamine were mixed with nineteen grams of 33% ammonium hydroxide and 100 c.c. of water. Sixty grams of 37% formaldehyde were then added slowly, maintaining the temperature at 50–60° C. The mixture was refluxed for two hours, after which 125 c.c. of benzene were added and the refluxing was continued. The water present and formed by the reaction was trapped out, and, when the product was dry, the benzene was removed by vacuum distillation. The product was a red, viscous liquid and weighed eighty-nine grams.

*Example 11*

Diethylene triamine was reacted with butyraldehyde in the ratio of one mol of amine to two mols of aldehyde according to the general procedure employed in the foregoing examples. After all of the aldehyde had been added, the mixture was heated on a steam bath for eight hours, and the water was then removed by heating to a still higher temperature. The product was a dark-yellow oil and was obtained in 98% yield.

*Example 12*

Tetraethylene pentamine was reacted with butyraldehyde in the ratio of one mol of amine to three and one-half mols of aldehyde as follows: Twenty-six parts of butyraldehyde were added in small portions to 18.9 parts of tetraethylene pentamine. The mixture was heated on a steam bath for one hour and was then refluxed for one hour. The water was removed by heating at atmospheric pressure. The product was a straw-colored liquid, thirty parts by weight being obtained.

*Example 13*

Tetraethylene pentamine was reacted with hexaldehyde in the ratio of one mol of amine to two and one-half mols of aldehyde as follows: Fifty-five and two-tenths grams of hexaldehyde were added slowly to 34.8 grams of tetraethylene pentamine. After the initial exothermic reaction had subsided, the mixture was heated to 80–90° C. and was then allowed to stand at room temperature for several hours. Seven grams of hexaldehyde were then added, and the mixture was heated to 150° C. until all the water had been removed. The product was a reddish liquid.

*Example 14*

Tetraethylene pentamine was reacted with heptaldehyde in the ratio of one mol of amine to two mols of aldehyde by heating at 90–100° C.

for eight hours. The water was then distilled off at atmospheric pressure. The product was a yellow liquid and was obtained in 90% yield.

Example 15

Tetraethylene pentamine and alpha-ethyl-beta-propyl acrolein were reacted in the ratio of one mol of amine to two mols of the aldehyde as follows: To 37.8 grams of tetraethylene pentamine were added 50.4 grams of alpha-ethyl-beta-propyl-acrolein containing one gram of butyric acid. The mixture was heated to 120–130° C. for five hours, and the temperature was then raised to 200° C. until all the water had been removed. The product was a dark, reddish oil and was obtained in practically quantitative yield.

Example 16

Thirty-one grams of the condensation product of equimolecular proportions of diethylene triamine and crotonaldehyde were reacted with 77.5 grams of 2-ethyl-hexyl-bromide, using 16 grams of sodium hydroxide dissolved in 20 c. c. of water to absorb the hydrogen bromide formed, as follows: The aldehyde-amine was heated to 140° C. and about one half of the 2-ethyl-hexyl bromide was added at such a rate that the temperature did not exceed 170° C. The temperature was then maintained at 140–150° C. for thirty minutes, one-third of the sodium hydroxide was added and the mixture was refluxed for ten minutes. The remainder of the 2-ethyl-hexyl bromide was then added, the mixture was refluxed for fifteen minutes, another one-third of the sodium hydroxide was added, the mixture was again refluxed for ten minutes, the final third of the sodium hydroxide was added and the mixture was then allowed to stand several hours. The product was washed twice with water and was then dried by heating to 200° C. at 50 mm. pressure.

Example 17

Diethylene triamine and hexaldehyde were reacted in the proportion of one mol of amine to two mols of aldehyde as follows: One hundred grams of hexaldehyde were added to 51.5 grams of diethylene triamine. After the exothermic reaction had subsided, the mixture was heated to a temperature sufficient to cause gentle refluxing for a period of one hour. The water was then removed by heating at 125° C. under reduced pressure. Fifty-nine grams of this condensation product were then reacted with 36½ grams of hexyl bromide, using 8.9 grams of sodium hydroxide dissolved in 20 c. c. of water to absorb the hydrogen bromide formed, as follows: The aldehyde-amine was heated to 140° C. and about one-half of the hexyl bromide was then added slowly with agitation. The reaction mixture became turbid and separated into two layers. After heating at 120–140° C. for about one-half hour, approximately one-fifth of the sodium hydroxide solution was added, and the mixture was heated for five minutes. The remainder of the bromide was then added, and, after refluxing for thirty minutes, the remainder of the sodium hydroxide solution was added. The heating was then continued for another thirty minutes. The water was removed by heating to 200° C. at 40 mm. pressure. On standing for a few hours, the dried product separated into two layers. The lower layer was tested as a photochemical inhibitor.

Example 18

N, N''''-dihexyl tetraethylene pentamine was reacted with butyraldehyde in equimolecular proportions as follows: Six and eight-tenths grams of butyraldehyde were added to forty-two grams of N, N''''-dihexyl tetraethylene pentamine, and the mixture was heated on a water bath for three and one-half hours. The product was an orange oil.

Example 19

Equimolar proportions of hexaldehyde and N, N''''-dibenzyl tetraethylene pentamine were reacted as follows: Eleven and one-tenth grams of hexaldehyde were added to fifty-two grams of N, N''''-dibenzyl tetraethylene pentamine, and the mixture was heated to 200° C. The product was dark-red, fifty-seven grams being obtained.

Example 20

N, N', N''-tri(o-methyl cyclohexyl) diethylene triamine was prepared by the action of ethylene dibromide on o-methyl cyclohexylamine. The product was separated from N, N' di(o-methyl cyclohexyl) ethylene diamine and N, N'-dicyclohexyl piperazine by distillation in vacuo. Thirty-eight grams of this product were mixed with three grams of para formaldehyde and one-hundred grams of benzene, and the mixture was refluxed, the water being separated out by means of a trap. At the end of one and one-half hours, no more water was given off. The benzene was evaporated off until the weight of the solution was 131 grams. This product was a 30% solution of the reaction product, which was suitable for use without further purification. This product may also be made in the absence of benzene, in which case it is obtained as a soft, tacky resin.

Example 21

Seventeen and one-tenth grams of butyraldehyde were added to 41 grams of N-(beta-morpholylethyl) ethylene diamine, and the mixture was heated for three hours on a water bath. The reaction product was then completely dried by heating under reduced pressure. The product was a straw-colored liquid and weighed 54 grams.

Example 22

Forty-five grams of di(beta-morpholylethyl) amine were reacted with 6.6 grams of butyraldehyde by heating on a water bath for three hours. The mixture was then dried by heating under reduced pressure. The product was a reddish liquid.

Example 23

Fifty-three and two-tenths grams of N-(beta-morpholylethyl) triethylene tetramine [obtained by reacting equimolecular proportions of tetraethylene pentamine and $\beta,\beta'$-di(chlorethyl) ether] were reacted with 20.5 grams of hexaldehyde by heating on a steam bath for three hours. The water was removed by heating under reduced pressure. The product was a viscous, dark orange-red liquid weighing 70 grams.

Example 24

Fifty-eight grams of N-(beta-morpholylethyl) triethylene tetramine [obtained by reacting equimolecular proportions of tetraethylene pentamine and $\beta,\beta'$-di(chlorethyl) ether] were mixed with 16.1 grams of butyraldehyde and heated on a steam bath for four and one-half hours. The water was removed under reduced pressure. The product was a reddish, oily liquid and was obtained in theoretical yield.

*Example 25*

Fifty grams of N,N''-di(beta-morpholylethyl) diethylene triamine [obtained by reacting one molar proportion of tetraethylene pentamine with two molar proportions of β,β'-di-chlorethyl ether] were treated with 15.2 grams of hexaldehyde by heating the reaction mixture on a steam bath for five hours. After drying, the product weighed 58.3 grams, which was equivalent to a 93% yield.

*Example 26*

Fifty grams of N,N''-di(beta-morpholylethyl) diethylene triamine were reacted with 10.9 grams of butyraldehyde in a manner similar to that employed in the preceding example. The product was obtained in theoretical yield.

*Example 27*

Fifty-eight and two-tenths grams of triethylene tetramine were reacted with twelve grams of paraformaldehyde in benzene solution. The amine was dissolved in the benzene and the aldehyde was then added. The mixture was refluxed and water formed was trapped off. Fifty-three grams of a yellow liquid was obtained. The components were reacted in equimolecular proportions.

*Example 28*

Fifty-six and seven-tenths grams of tetraethylene pentamine were reacted with nine grams of formaldehyde. A substantially theoretical yield of the condensation product was obtained. The components were reacted in equimolecular proportions.

As demonstrated in the foregoing examples, various aldehyde and polyalkylene polyamines may be employed in preparing the desired stabilizers. Other aldehyes and polyalkylene polyamines may be substituted for the specific materials used in the various examples. Thus the aldehyde may be aliphatic, cycloaliphatic or alicyclic, or it may contain a ring-substituted aliphatic radical, such as aralkyl, furfuryl and similar radicals. Also included are aromatic compounds although these are not preferred. The aldehydes preferably should not contain acidic substituents, such as carboxyl or sulfonic radicals, or other substituents which will react with the polyalkylene polyamine, but they may contain various neutral or basic substituents, such as alkyl, aryl, aralkyl, alkoxy, aryloxy, amino, ester, amine salt, ether, etc., groups, which are substantially inert in the reaction with the polyalkylene polyamine and do not destroy the inhibiting effect of the final products. Representative examples of aldehydes are acetaldehyde, propionaldehyde, acrolein, aldol, benzaldehyde, vanillin, piperonal, cyclohexanal, beta-chloro butyraldehyde, furfural, phenylacetaldehyde, and the like. The polyalkylene polyamines which may be used comprise compounds having the structural formula:

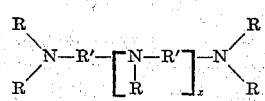

in which R' is alkylene and R is selected from the group consisting of aliphatic, cycloaliphatic, alicyclic, and ring-substituted aliphatic radicals and hydrogen, and $x$ is a whole number, the polyalkylene polyamine containing at least one amino hydrogen so that condensation with the carbonyl compound may be effected. Included are compounds having the structural formula

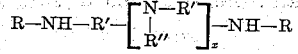

in which R is selected from the group consisting of aliphatic, cycloaliphatic, alicyclic, and ring-substituted aliphatic, R' is alkylene, R'' is selected from the group consisting of aliphatic, cycloaliphatic, alicyclic, and ring-substituted aliphatic radicals and hydrogen, and $x$ is a whole number. The simple unsubstituted polyalkylene polyamines having the structural formula $$NH_2-R'-[NH-R']_x-NH_2$$

in which R' is alkylene and $x$ is a whole number are readily available and generally yield particularly good inhibitors and constitute a preferred class of materials. Also included are morpholyl and analogous compounds having the structural formula

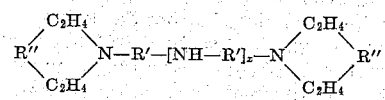

in which R' is alkylene, R'' is oxygen or sulfur, and $x$ is a whole number. Also included are piperazyl compounds having the structural formula

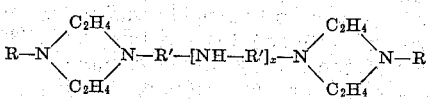

in which R is selected from the group consisting of aliphatic, cycloaliphatic, alicyclic, and ring-substituted aliphatic radicals and hydrogen, R' is alkylene and $x$ is a whole number. In each of the foregoing definitions and elsewhere in the specification and claims, the term "aliphatic" includes saturated and unsaturated, straight and branched chain radicals, and the term "ring-substituted aliphatic" includes radicals such as aralkyl, furfuryl, tetrahydrofurfuryl and the like. Also, in each of the foregoing formulas, $x$ is preferably a number from one to ten, inclusive. The alkylene radicals represented by R' include cycloaliphatic radicals, such as the cyclohexylene radical ($-C_6H_4-$). The aliphatic, cycloaliphatic, alicyclic, ring-substituted aliphatic, and alkylene groups are preferably hydrocarbon but they may contain various substantially neutral or basic substituents such as alkyl, aryl, aralkyl, alkoxy, aryloxy, ester, amine salt, ether, etc., groups, which are substantially inert in the reaction with the aldehyde and do not adversely affect the inhibiting properties of the product. In addition, and particularly in the longer chain, higher molecular weight polyamines, it is possible to replace some the aliphatic, cycloaliphatic, alicyclic, ring-substituted aliphatic, and alkylene radicals with aromatic radicals and to have some acidic substituents such as carboxyl, hydroxyl, etc. radicals present. These modifications tend to lessen the inhibiting effect of the products and they are generally not desirable. However, when they are judiciously used, the products will still retain some inhibiting power. Such modifications are equivalents of the compounds of the invention and are intended to be covered by the claims.

The aldehyde compound and polyalkylene polyamine may be reacted in a wide range of proportions. The minimum amount of aldehyde which can react with the amine is one-half mol to 9 mols of amine. Also as has been previously indicated in the description of the invention there are certain theoretical maximum proportions in which the aldehyde will react with a single molecule of a given polyalkylene polyamine. This maximum may be generally stated as one mol of aldehyde to every two amino hydrogen atoms. It must also be remembered that some aldehydes tend to polymerize and, therefore, in at least some instances more than the theoretical amount may be employed. The proportions of reactants are not critical since the reaction products of aldehydes and polyalkylene polyamines are more or less effective inhibitors regardless of the amount of combined aldehyde. Also if amounts of aldehyde greater or less than the reactive limits are employed, the result is merely that the crude product contains some unreacted starting material.

Small amounts of acidic or alkaline condensation catalysts may be present in the reaction mixture, but the reaction proceeds well without such added materials, and, therefore, the latter condition is preferred in the practice of the invention.

It is also to be understood that mixtures of polyalkylene polyamines may be employed. Also simple amines, such as methylamine, benzylamine, furfurylamine, etc. may be employed in conjunction with a polyalkylene polyamine to produce modified compounds coming within the invention, which are effective photo-chemical inhibitors. Example 10 illustrates the use of ammonia in conjunction with tetraethylene pentamine according to this variation of the invention. Any temperature at which condensation between the aldehyde and amine takes place may be used. The reactions ordinarily proceed at room temperature with the evolution of heat, but temperatures above and below room temperature may be employed. Inasmuch as the reaction is generally strongly exothermic, some care should be exercised to keep it under control. Obviously the reaction should be conducted below decomposition temperatures. These vary somewhat depending upon individual compounds and the time of heating but are usually about 250 to 300° C. Also in accordance with general rules it will sometimes be desirable to start the reaction at a low temperature and progressively increase the temperature as the reaction proceeds toward completion.

The inhibitors are customarily used in small amounts, for example, not more than several per cent by weight based on the weight of the cyclized rubber.

The tests conducted show that the compounds of this invention prolong the life of paints produced from cyclized rubber and also prolong the lift of moistureproofing compositions produced by cyclized rubber. For instance, the products of Examples 5, 27 and 28 added to a paint of a cyclized rubber showed the same degree of deterioration after 205 days of exposure to diffused daylight that the same paint containing no stabliizer showed in 39 days. For this purpose but one-half a per cent of the condensation product was used based on the weight of the cyclized rubber. Additions of about 2% bloomed out on the surface of the paint. The product of Example 2 likewise gave good stabilization when added in amounts of about one or 2% to paint. The other condensation products of this invention also stabilize cyclized rubber contained in paint compositions.

A moistureproofing composition was prepared from a partially oxidized cyclized rubber with a softening point of about 55° C. which contained a considerable percentage of paraffin. This was coated onto glassine paper which was hung in the window in direct sunlight. The heat-sealing properties of the sheet were materially improved by the stabilizer of Example 5. Samples of the sheet coated with moistureproofing formulas which were identical except that one contained the stabilizer and one did not were hung in the window and tested from time to time. The coating containing the stabilizer retained its good heat-sealing properties after nine days exposure whereas the control sheet retained comparable heat-sealing qualities for only five days.

Similar tests were run on moistureproofed sheets to which the stabilizers of Examples 5 and 2 were added. These prolonged the life of the cyclized rubber 170 and 140% respectively. The other condensation products referred to herein likewise stabilize cyclized rubbers used in moistureproofing compositions.

The paints and moistureproofing compositions may contain fillers, coloring materials, plasticizers, etc.

What I claim is:

1. A cyclized rubber having admixed therewith in a quantity sufficient to act as a stabilizer the condensation product of an aldehyde and a polyalkylene polyamine having the structural formula

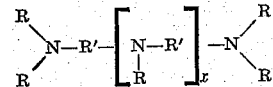

in which R' is alkylene, R is selected from the group consisting of aliphatic, cycloaliphatic, alicyclic, and ring-substituted aliphatic radicals and hydrogen, and $x$ is a whole number from 1 to 10, said polyalkylene polyamine containing at least one amino hydrogen atom.

2. A cyclized rubber having admixed therewith in a quantity sufficient to act as a stabilizer a condensation product of formaldehyde and tetraethylene pentamine.

3. A cyclized rubber having admixed therewith in a quantity sufficient to act as a stabilizer a condensation product of formaldehyde and triethylene tetramine.

HAROLD J. OSTERHOF.